United States Patent [19]

Serrao

[11] Patent Number: 5,202,957
[45] Date of Patent: Apr. 13, 1993

[54] FULL MOTION VIDEO TELEPHONE SYSTEM

[75] Inventor: Thomas M. Serrao, Bucksport, Me.

[73] Assignee: Future Communications, Ellsworth, Me.

[21] Appl. No.: 565,579

[22] Filed: Aug. 9, 1990

[51] Int. Cl.$^5$ .............................................. H04N 7/12
[52] U.S. Cl. ........................................ 379/53; 358/85
[58] Field of Search ............... 379/53, 93, 96; 358/85, 358/134, 137

[56] References Cited

U.S. PATENT DOCUMENTS

| | | |
|---|---|---|
| 1,030,240 | 6/1912 | Hoglund . |
| 1,805,594 | 5/1931 | Parker . |
| 1,835,031 | 12/1931 | Espenschied et al. . |
| 1,932,253 | 10/1933 | Ives . |
| 1,980,150 | 11/1934 | Baird . |
| 2,017,883 | 10/1935 | Zworykin . |
| 2,048,604 | 7/1936 | Finch . |
| 2,056,761 | 10/1936 | Baird . |
| 2,095,360 | 10/1937 | Green . |
| 2,099,115 | 11/1937 | Ives . |
| 2,114,500 | 4/1938 | Nicolson . |
| 2,125,006 | 7/1938 | Nicholson . |
| 2,314,471 | 3/1943 | Wright . |
| 3,263,027 | 7/1966 | Beltrami . |
| 3,352,966 | 11/1967 | Sawazaki et al. . |
| 3,612,767 | 10/1971 | Anderson et al. ................. 379/54 |
| 3,662,110 | 5/1972 | Fossen et al. ..................... 379/54 |
| 3,806,644 | 4/1974 | Browne et al. .................... 379/53 |
| 3,873,771 | 3/1975 | Kleinerman et al. .............. 379/53 |
| 3,922,491 | 11/1975 | Bjork et al. ....................... 379/54 |
| 3,976,831 | 8/1976 | Danell et al. ..................... 379/53 |
| 3,980,830 | 9/1976 | Wendlind et al. ................. 379/53 |
| 4,015,115 | 3/1977 | Corcoran .......................... 379/53 |
| 4,099,202 | 7/1978 | Cavanaugh ....................... 358/85 |
| 4,258,387 | 3/1981 | Lemelson et al. ................ 358/85 |
| 4,485,400 | 11/1984 | Lemelson et al. ................ 358/85 |
| 4,516,156 | 7/1985 | Fabris et al. ..................... 358/85 |
| 4,529,839 | 7/1985 | Colton et al. .................... 379/53 |
| 4,530,084 | 7/1985 | Strebel ............................. 379/53 |
| 4,654,484 | 3/1987 | Reiffel et al. .................... 379/53 |
| 4,715,059 | 12/1987 | Cooper-Hart .................... 379/53 |
| 4,774,562 | 9/1988 | Chen et al. ....................... 358/13 |
| 4,774,574 | 9/1988 | Daly et al. ....................... 379/53 |
| 5,079,627 | 1/1992 | Filo ................................. 379/53 |

Primary Examiner—James L. Dwyer
Assistant Examiner—Stella Woo
Attorney, Agent, or Firm—Daniel H. Kane

[57] ABSTRACT

A full motion video telephone system combines mechanical scanning from the early era of television with modern video and digital communications technology for operation over conventional loaded bandwidth limited telephone lines. A camera pickup mechanical disk scanner causes scanning of an object in picture frames with an image resolution in the range of 30-90 scan lines per frame and full motion resolution in the range of 15-30 frames per second. A photomultiplier sensor generates an analog serial scanning signal with a bandwidth within the analog frequency range of 0-90 kHz. The synchronous motor of the mechanical scanner is synchronized with a first clock signal generated from a reference clock standard. Analog to digital conversion permits transmission by a high speed modem on the telephone lines. The receiving station is similar permitting full motion image reproduction with acceptable resolution. The camera receiver mechanical scanner is synchronized with respect to the same reference clock standard so that the camera pickup and camera receiver are in phase.

18 Claims, 6 Drawing Sheets

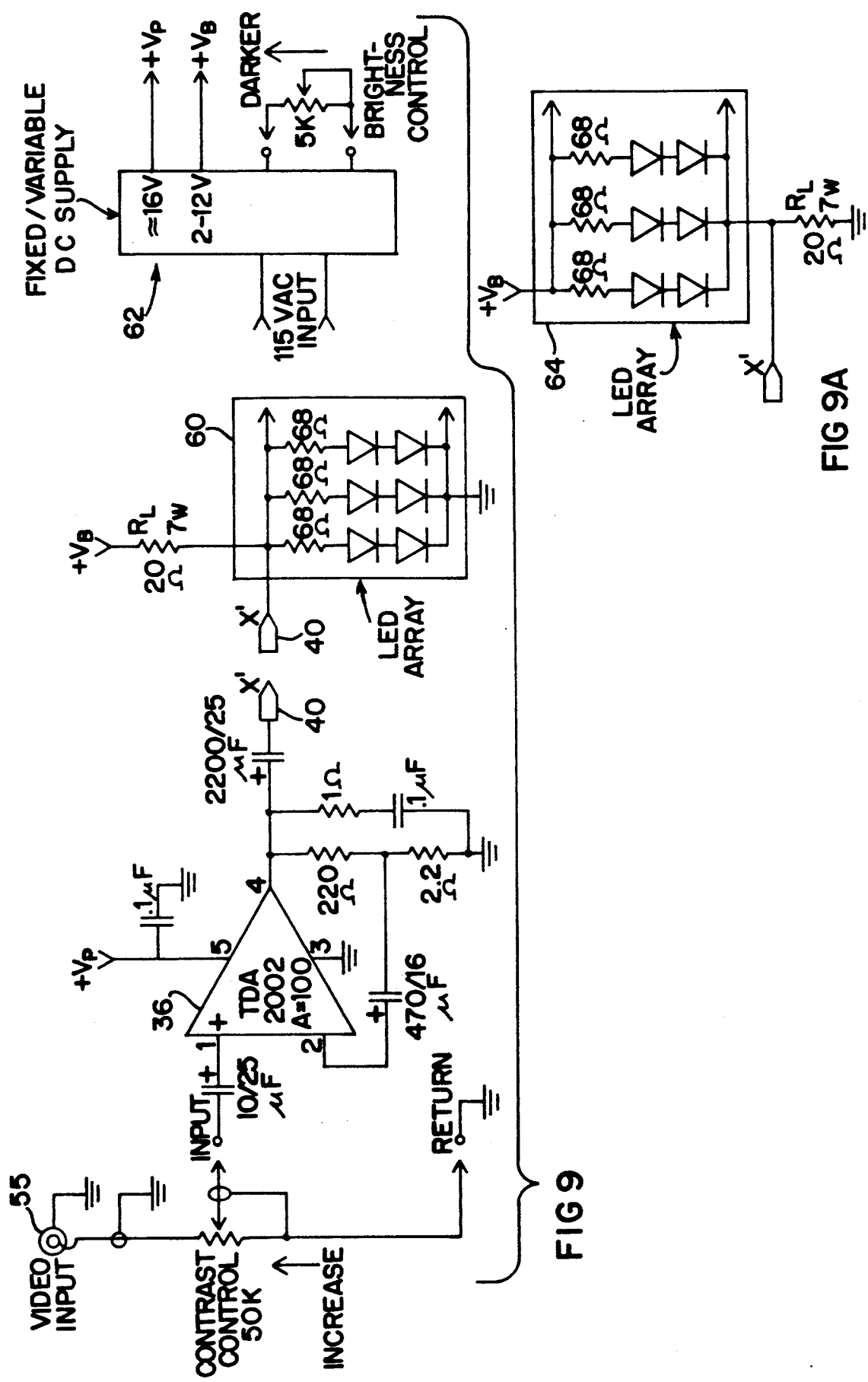

FULL MOTION VIDEO TELEPHONE SYSTEM

TECHNICAL FIELD

This invention relates to a new full motion video telephone system capable of operating over conventional bandwidth limited telephone lines. The invention permits transmission of full motion image information signals along with audio signals for real time visual and audio communication over loaded telephone lines limited to effective bandwidth in the range of, for example, 0–4 kHz. To accomplish this the invention uniquely combines elements from the early era of television such as mechanical scanning, with modern video and digital telecommunications technology.

BACKGROUND ART

The problem of transmitting wide band television and video image information over narrow band telephone lines was recognized at an early date for example by Espenschied et al. in U.S. Pat. No. 1,835,031 issued in 1931. Espenschied et al. noted for example in column 2 that transmission of television pictures or movies would require a bandwidth of for example at least 1 MHz while the frequency bandwidth of conventional cables at the time apparently did not exceed 5 KHz. Espenshied et al. in 1929 therefore invented the coaxial cable described in U.S. Pat. No. 1,835,031 to provide a wide band channel for coaxial cable guided transmission of video signals for television. Such coaxial cable however is not available over conventional telephone lines which continue to be even more severely limited in bandwidth by loading to the 4 KHz range.

A search was conducted in the patent records of the USPTO in subclasses related to two way audio and visual telephone communication systems, video telephone systems, and television/telephone systems. These patents are found in the telephone Class 379, Subclasses 53 and 54. Most of the patents in the pertinent Subclasses of the search describe television/telephone or video telephone systems which incorporate two separate transmission channels, a narrow bandwidth audio channel and a wide bandwidth video channel. Such systems are exemplified for example by the Anderson et al. U.S. Pat. No. 3,612,767 of Bell Telephone Laboratories, Inc. for a system with audio and wide band communication paths; the Bjork et al. U.S. Pat. No. 3,922,491 of Telefonaktiebolaget of Sweden for a telecommunication system with a wide band channel by the side of a telephone connection; Fossen et al. U.S. Pat. No. 3,662,110 of Bell Telephone Labs for a combined wide band narrow band communication; and the many patents on teleconferencing such as the Fabris et al. U.S. Pat. No. 4,516,156 of Satellite Business Systems of McLean Virginia for a teleconferencing method and system using wide band communication links; the Colton et al. U.S. Pat. No. 4,529,839 of AT&T Bell Laboratories for a multi-location video conference system using satellite channels, etc. The Strebel U.S. Pat. No. 4,530,084 of the Heinrich Hertz Institute of Berlin describes a communications network for audio and visual data on a wide band optical fiber channel.

A second group of patents describe techniques for reducing bandwidth by data compression. The Eastman Kodak U.S. Pat. Nos. 4,774,574 and 4,774,562 of Daly et al. and Chen et al. describe the use of spatial transform coding for image compression. However this cannot achieve the several orders of magnitude reduction required to transmit on the telephone lines. The Eastman Kodak Company systems similar to the Bell Telephone Laboratory PicturePhone (TM) systems can only achieve still image communication. The current television standard of 525 scan lines per frame is reproduced on the CRT television screen, with 30 or 60 frames per second. The television video signal requires a bandwidth in the order of 4 or 4.5 megahertz on a carrier frequency and this bandwidth cannot be reduced for transmission on a conventional telephone line. Bell Telephone Laboratories has apparently achieved signal compression from 4.5 to 1.5 MHz which can pass in pulse code modulation (PCM) on the T carrier associated with elaborate equipment between some branch exchanges. However even the compressed signal cannot pass on the conventional 4 KHz narrow band transmission telephone lines.

A third group of patents is directed to the so-called "slow scan" or "slow scanning" method of transmission of image information over the narrow bandwidth telephone lines. The limitations of the slow scan method for transmission of high resolution television images over the narrow bandwidth telephone lines is described in columns 1 and 2 of the Reiffel et al. U.S. Pat. No. 4,654,484 issued Mar. 31, 1987 and assigned to Interand Corporation. For high resolution images only still images may be transmitted. As stated in column 1: "The time necessary for present slow scan systems using current compression schemes to transmit sufficient information for a video presentation of acceptable quality requires in the order of 90 to 120 seconds per display frame at transmission rates of 9,600 bits per second." The conventional "PicturePhone" (TM) video telephone is therefore able to transmit still images only. The Bell Laboratories "PicturePhone" (TM) is further described in columns 1 and 2 of the Wendlind et al. U.S. Pat. No. 3,980,830. Reference is made to a further description in the Bell Technical Journal, Volume 50, at pages 235–269 (1971). This system provides still image transmission of a person's face apparently with satisfactory picture resolution.

Multiplexing of slow scan television signals and voice signals over a telephone line is described in the Cavanaugh U.S. Pat. No. 4,099,202 assigned to Robot Research Inc. of San Diego, Calif. Apparently at lower resolution the slow scan rate still requires approximately 8 to 32 seconds per video frame to provide an image of acceptable quality. This patent discusses the problems of communicating voice signals at the same time as the slow scan television still image transmission. Further variations on the slow scan picture telephones are described in the Lemelson et al. U.S. Pat. Nos. 4,258,387 and 4,485,400; the Cooper-Hart U.S. Pat. No. 4,715,059 for a conversational video phone assigned to Luma Telecom, Inc. of Santa Clara, Calif.; and the Danell et al. U.S. Pat. No. 3,976,831 of Telefonaktiebolaget, Stockholm Sweden for a picture telephone with stationary pictures.

A more complete comparison of the Bell System PicturePhone (TM) video telephone with commercial television standards is described in the Bell Telephone Laboratories U.S. Pat. No. 3,806,644 of Browne et al. Simultaneous transmission of FM slow scan video signals and AM single sideband audio signals over an ordinary telephone transmission line is described in the Kleinerman et al. U.S. Pat. No. 3,873,771 assigned to Telescan Communications Systems, Inc. The ITT Picture Phone System is described in the Corcoran U.S. Pat. No. 4,015,115. A further description of the slow scan method and vidicon cameras having low scanning speed is found in the Sawazaki et al. U.S. Pat. No. 3,352,966 describing a television telephone system.

A fourth group of patents relate to the early television technology patents also found in the Subclasses related to television/telephone systems. These patents are perhaps the patent references of greatest interest in the prior art with respect to the present invention. The differences of the early television technology patents from the present invention are as follows.

The Ives U.S. Pat. No. 2,099,115 issued in 1937 describes a communication system with separate two way telephone and television channels. The video signal is generated by a light source, a mechanical rotating scanning disk with apertures arranged in a spiral for scanning a beam from the light source across the field of view, and photocells that generate the serial analog scanning signal containing the light amplitude image information. The 40 kHz video signal generated by Ives requires a broad band channel for transmission. Such a channel would require a coaxial cable or, as suggested by Ives at page 6, column 2, lines 66–71, a radio link or radio channel. Another mechanical scanning disk system at the receiving station reproduces image information and is maintained in synchronism with the mechanical scanning disk at the transmitting station. It appears that transmitting and receiving scanning disks are provided at each station.

The narrow band audio signal is transmitted over a separate telephone line or telephone channel. According to Ives the telephone line is used for the speech path only. There is no suggestion of using the telephone line for transmitting the video signal also. In fact Ives was correct in assuming that the wideband analog video signal developed by his system required a separate broadband channel. The simple wire telephone line used at the time of Ives was effectively bandwidth limited by the high frequency noise of a battery/wire/-ground system.

Continuing developments in telephone lines have further reduced the bandwidth. Sir Oliver Heavyside's discovery that inductance in a telegraph or telephone line could be used to reduce high frequency noise and distortion lead to his invention of the loaded line. Choke coils periodically coupled into the line interact with the resistance and capacitance of the line effectively to provide a distributed low pass filter which cuts off high frequency noise and distortion. As a result the bandwidth of contemporary conventional telephone lines is typically 0–4 kHz.

The Beltrami U.S. Pat. No. 3,263,027 issued in 1966 describes a more recent use of a Nipkow disk in a "Simultaneous Bilateral Televideophonic Communication System". Beltrami uses a cathode ray tube (CRT) as a flying spot scanner to illuminate and scan an object. A photocell generates the analog serial scanning signal encoding the light amplitude image information. The bandwidth of the Beltrami video signal is in the order of 1 MHz.

The 1 MHz bandwidth signal of Beltrami requires a broadband transmission channel which Beltrami states can be wire or wireless. Beltrami specifically suggests an antenna linked radio channel for videotelephonic transmission. It is a broadband RF AM system of transmission. For a wire link, a dedicated coaxial cable would be required because the Beltrami video signal cannot be transmitted over a conventional telephone wire.

The only use of the single Nipkow scanning disk in the Beltrami system is to generate a sync signal for both the transmitting and receiving stations. The sync signal is used to maintain the CRT scanners in synchronism at the two locations. The CRT scanner pickup and receiver generate and utilize the video signal that requires a transmission channel bandwidth in the MHz range.

Another television system using mechanical rotating scanner disks with apertures in a spiral array for the camera pickup and receiver is described in the Green U.S. Pat. No. 2,095,360 issued in 1937. The Green system clearly requires and uses a broad band radio transmission channel. Green uses a single side band radio system with a final image band of 85 kHz on a broadband carrier.

The Wright U.S. Pat. No. 2,314,471 describes another television and speech transmission system with two channels. The telephone is operated over a separate telephone line path. The video system uses a mechanical scanning disk camera pickup at each station and a CRT receiver. The video signal in the MHz range is transmitted over a broadband channel including repeater stations. The Nicolson U.S. Pat. No. 2,125,006 describes a television communicator using a broadband radio transmission system for the television signal which is broadcast over antenna wires. The sound signal is broadcast over a separate channel. The early Zworykin television described in U.S. Pat. No. 2,017,883 issued in 1935 is an all electronic TV system using CRT scanners and video signals in the MHz range.

The earlier Ives television system in U.S. Pat. No. 1,932,253 of 1933 is a two channel system. The telephone and sync signals are transmitted over a telephone wire while the picture signal is transmitted over radio channels. Alternatively it appears that a dedicated wideband trunk line may also interconnect the stations. Ives uses a single scanning disk with apertures in spiral form at each station for both the camera pickup and receiver.

Other rotating scanning disk television systems are described by Baird in U.S. Pat. Nos. 1,980,150 and 2,056,761. The latter patent also describes the use of a rotating mirror drum for the mechanical scanning apparatus illustrated in FIGS. 3, 4 and 5. For transmission of the image signals, a trunk circuit must be modified and dedicated for high bandwidth transmission. The earlier Baird U.S. Pat. No. 1,980,150 is effectively a slow scan picture transmission system which cannot operate in real time. The Finch U.S. Pat. No. 2,048,604 describes an early teletype system for printing a picture. Slow scan signals are transmitted over a telephone line to control an electromechanical printer and drum. Also of related interest are the Parker U.S. Pat. No. 1,805,594 issued in 1931 and the early Hoglund U.S. Pat. No. 1,030,240 issued in 1912 which also appear to describe low resolution, slow scan, effectively still image picture phones which do not appear capable of operating in real time.

Further background on the history of video telephone efforts can be found in the book *The Video Telephone* "Impact of a New Era in Telecommunications", by Edward M. Dickson and Raymond Bowers, Praeger Publishers, 1974. This book publishes the results of a study and technology assessment of video telephone research and development conducted by the Cornell University Program on Science, Technology and Society funded by RANN and NSF.

OBJECTS OF THE INVENTION

It is therefore an object of the present invention to provide a new full motion video telephone system capable of operating over conventional bandwidth limited telephone lines. The invention seeks to avoid the conventional requirement of a separate broadband channel for the video signals.

Another object of the invention is to permit transmission of full motion image information signals for full motion visual communication in real time over loaded telephone lines. The effective bandwidth of such loaded telephone lines is typically in the range of for example, 0-4 kHz.

A further object of the invention is to enable transmission of sufficient image information in signals over a conventional loaded telephone line to permit full motion visual communication in real time with acceptable image resolution and acceptable motion resolution. According to the invention this is possible through a unique coacting combination of elements from the early era of television such as mechanical scanning apparatus with modern video and digital telecommunications technology.

DISCLOSURE OF THE INVENTION

In order to accomplish these results the invention provides a full motion video camera pickup in the form of a first mechanical flying spot scanner for causing light scanning of an object in picture frames. The image resolution of the frames is in the range of approximately 30-90 scan lines per frame while the full motion resolution is in the range of approximately 15-30 frames per second. The mechanical flying spot scanner incorporates a photomultiplier tube sensor which generates an analog serial scanning signal in response to the scanning pickup. The analog signal bandwidth of the analog serial scanning signal is within the range of approximately 0-90 kHz encoding full motion light amplitude image information of an object or caller in real time.

A feature and advantage of the mechanical scanning camera pickup according to the invention is that an analog serial scanning signal or video signal can be generated with an analog frequency bandwidth substantially lower than the 4 MHz bandwidth required by modern television signals. Mechanical scanning can be used to restrict the bandwidth sufficiently so that the video signal can be transmitted over bandwidth limited loaded telephone lines while still encoding full motion image information with acceptable full motion image resolution.

A first clock circuit generates a first clock signal at the mechanical scanning camera pickup in synchronism with a selected reference clock. A first synchronous drive motor coupled to the first mechanical flying spot scanner drives the mechanical scanner in synchronism with the first clock signal. The reference clock standard and first clock signal perform an important function of preserving phase image information for subsequent reproduction of light amplitude image information in proper phase as hereafter described. An advantage of the use of mechanical scanning is that it is not necessary to interleave or incorporate a wideband clock signal with the serial scanning signal for transmission. The limited bandwidth of the loaded telephone line can therefore be reserved primarily for transmitting the light amplitude image information signal.

According to the invention an analog to digital (A/D) convertor converts the analog serial scanning signal to a digital signal. In the preferred example, the analog serial scanning signal generated by the PMT is preamplified as a pulse amplitude modulated signal for digitizing by the A/D converter. A first modem at a first location or station couples the digital signal to a bandwidth limited telephone line for transmission over the telephone line to a second location. The digital signal is coupled through a second modem at the second location to a digital to analog (D/A) converter for digital to analog conversion. The D/A converter substantially reconstructs the original analog serial scanning signal encoding the full motion light amplitude image information of the object in real time.

The full motion video camera receiver at the location or station is a second mechanical flying spot scanner for causing projection and mechanical scanning of light in scan lines assembled into picture frames with light amplitude in accordance with the analog serial scanning signal. The mechanical scanner according to the invention is capable of reproducing the full motion image information about the object or caller in real time.

To this end a second clock circuit provides a second clock signal at the camera receiver substantially in synchronism with the first clock signal. A second synchronous drive motor coupled to the second mechanical flying spot scanner drives the second mechanical scanner in synchronism with the second clock signal. As a result the scanning lines per frame and frames per second are substantially in synchronism and in phase with the first mechanical flying spot scanner reproducing a full motion image of the object in real time.

In the preferred embodiment the camera pickup and camera receiver use mechanical scanning disks such as Nipkow disks. Each mechanical scanning disk is formed with scanning hole apertures arranged in a scanning configuration such as a spiral. Rotation of the scanning disk causes light scanning of a picture frame in scan lines with the number of scanning hole apertures coinciding with the number of scan lines per frame. According to the invention the number of scanning hole apertures and number of scan lines is in the range of approximately 30-90. The number of scan lines is selected according to the invention to provide acceptable image resolution but approximately an order of magnitude less than conventional television. The first and second synchronous drive motors drive and rotate the respective scanning disks in synchronism with each other and in revolutions per minute in the range of approximately 900-1800 RPM's. Below the lower limit full motion resolution may be lost while beyond the upper limit the bandwidth may exceed the bandwidth of the telephone line transmission channel.

For the preferred parameters, the mechanical scanning disk is formed with approximately 60 scanning hole apertures arranged, for example, in one or two spirals. The first and second synchronous drive motors rotate the respective scanning disks at approximately 1200 RPM. An advantage of the preferred parameters is that the system provides transmission of image information signals for full motion resolution of approximately 20 frames per second. The 20 frames per second frequency exceeds the critical flicker frequency for human vision providing smooth reproduction in real time of full motion of an original object or caller.

In the preferred range and at the preferred parameters, the camera pickup generates an analog serial scanning signal with an analog signal bandwidth in the preferred frequency range of approximately 20 Hz–36 kHz. At this analog frequency bandwidth, the corresponding digitized digital signal may be transmitted over the bandwidth limited telephone line. With a modem operating at a transmission rate of at least 2400 baud, and preferably 4800 baud, full motion image information may be communicated in real time. The preferred range for the modem transmission rate is approximately 2400–9800 baud for the parameter ranges of the mechanical scanning camera pickup and receiver according to the invention. Beyond the lower limit the transmission of full motion image information in real time may be lost while at the upper limit, the bandwidth limits of the loaded telephone line may be exceeded.

In the preferred example, the analog to digital convertor converts the analog serial scanning signal to a digital signal for transmission from the first location to the second location without interleaving and transmitting the first clock signal. According to the invention it is not necessary to transmit any sink signal over the telephone line with the image information signal. Rather the second clock circuit at the second location independently generates a second clock signal from the reference clock standard. For the reference clock standard, the first and second clock signals may be independently derived from the standard utility 60 Hz power supply available at the first and second stations. Alternatively, a very low frequency narrow band synch signal or clock signal may be transmitted with the full motion image information signal over the bandwidth limited telephone line.

Other objects, features and advantages of the invention are apparent in the following specification and accompanying drawings.

BRIEF DESCRIPTION OF THE DRAWINGS

FIG. 9 is a detailed schematic circuit diagram of the full motion video camera receiver light source and related circuitry for an LED array.

FIG. 9A is a fragmentary detailed schematic circuit diagram of an alternative circuit configuration for the LED array.

DESCRIPTION OF PREFERRED EXAMPLE EMBODIMENTS AND BEST MODE OF THE INVENTION

Figure 2:
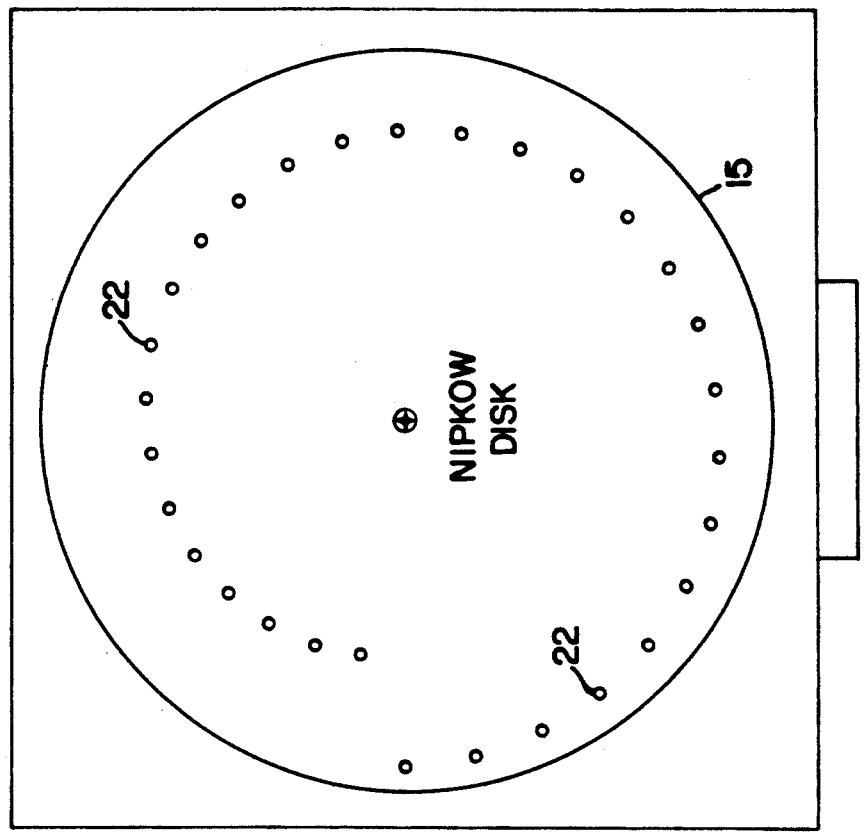
FIG. 2 is a front view of the full motion video camera with the front cover and photomultiplier tube sensor removed showing the Nipkow disk with scanning hole apertures in a spiral configuration for light scanning in scan lines across a scanning aperture.
Figure 1:
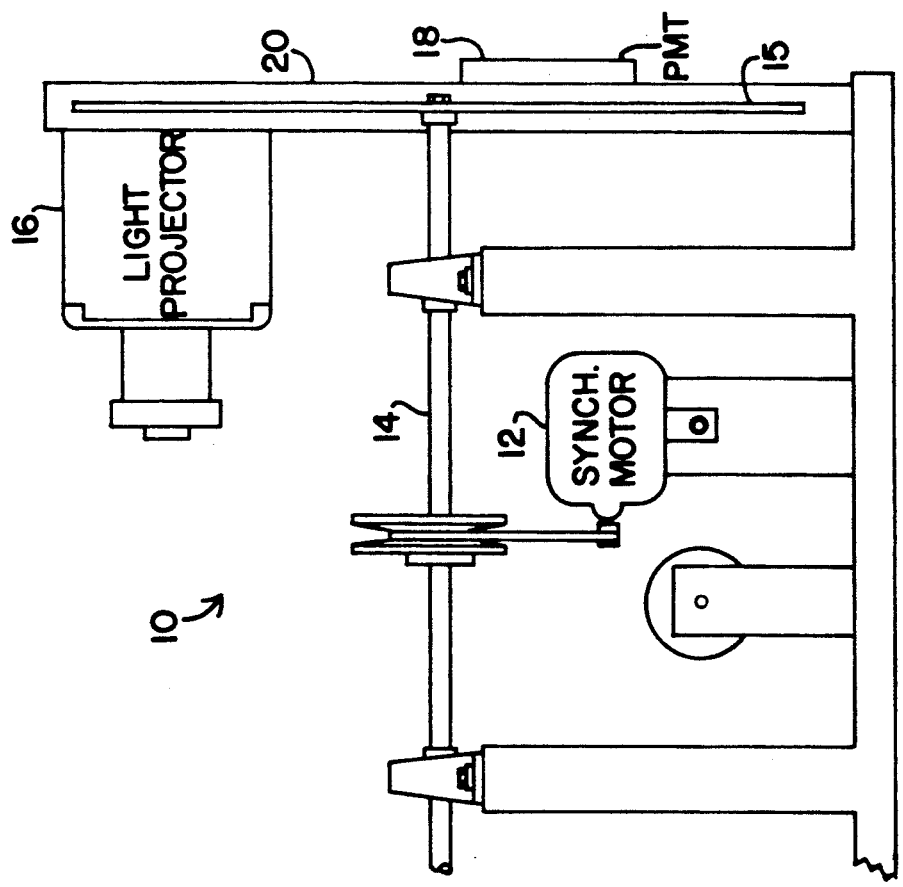
FIG. 1 is a diagrammatic side view of a full motion video camera pickup according to the invention using a mechanical flying spot scanner in the form of a mechanical scanning disk or Nipkow disk.
Figure 3:
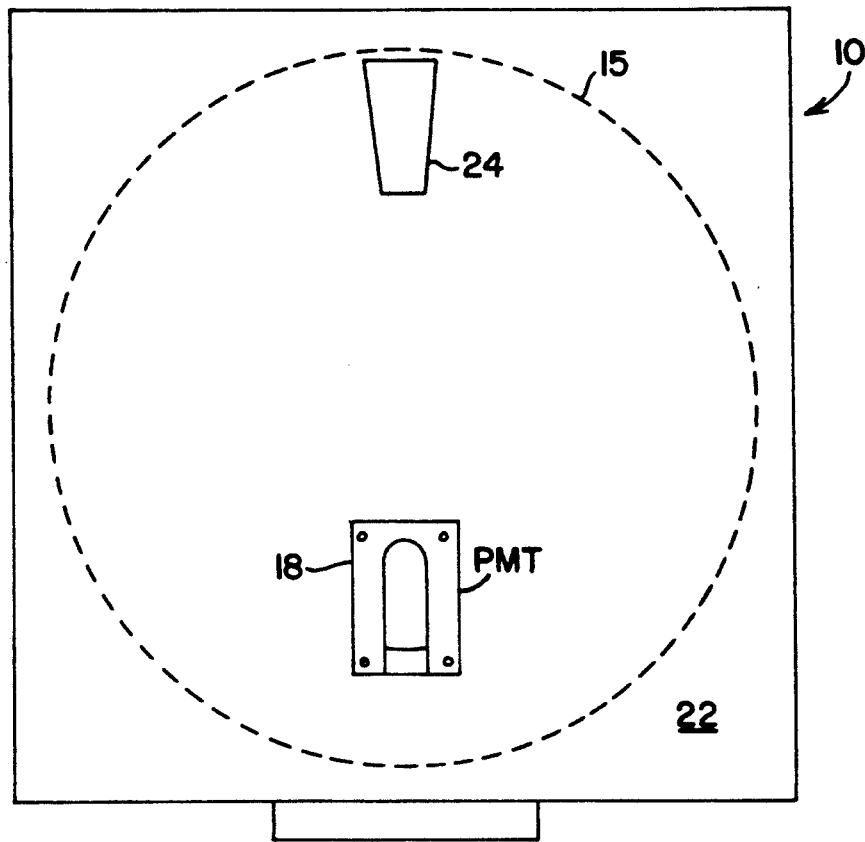
FIG. 3 is a diagrammatic front view of the full motion video camera pickup with the front cover in place showing the position of the photomultiplier tube sensor and scanning aperture.
Figure 7:
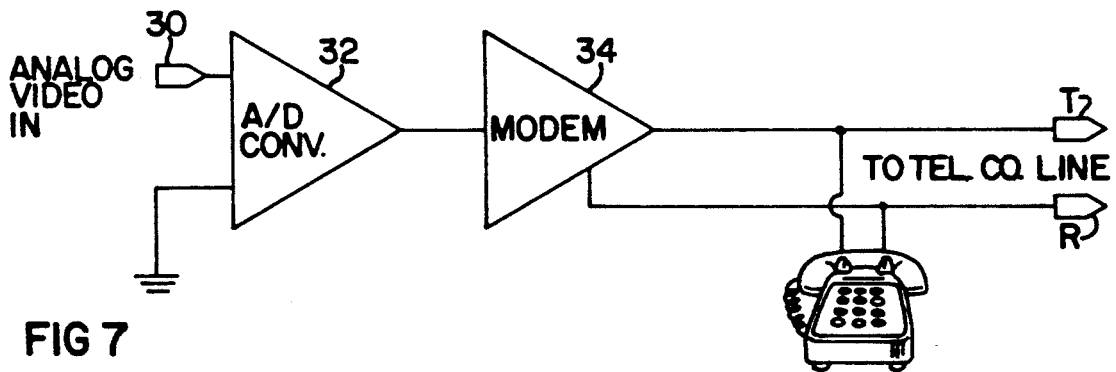
FIG. 7 is a simplified block diagram of the transmitting station for the full motion video telephone system.

A full motion video camera 10 with a mechanical flying spot scanner is illustrated in FIGS. 1-3. A synchronous motor 12 drives a shaft 14 which rotates a mechanical scanning disk or Nipkow disk 15. The video camera configuration shown in FIG. 1 is for a full motion video camera pickup with a light projector 16 positioned behind the scanning disk 15, on the side of the scanning disk 15 opposite an object to be scanned, for scanning pickup of a light amplitude image information signal.

In the front view of FIG. 2 the front cover 20 and PMT 18 are removed showing the scanning hole apertures 22 of the scanning disk 15. The scanning apertures 22 are arranged in a spiral configuration for scanning the light from light source 16 in successive scan lines across the scanning aperture positioned for example at approximately 12:00 o'clock on the scanning disk 15. As shown in FIG. 3 with the front cover 22 and PMT 18 in place, the scanning aperture 24 spans the distance between the inner and outer ends of the spiral configuration of scanning apertures 22. The width of the scanning aperture 24 is approximately equal to the space between successive scanning apertures 22 and is therefore wider at the top than the bottom. The scanning aperture 24 in the example of FIG. 3 assumes a reverse trapezoidal shape.

In FIGS. 2 and 3 a simplified Nipkow disk is shown with only 30 scanning apertures 22 for the purposes of illustrating the principle of Nipkow disk light scanning. While the number of scanning apertures in the spiral may be selected to be in the range of approximately 30–90, the preferred number of scanning apertures 22 is approximately 60 providing an image resolution per picture frame of approximately 60 scan lines.

While the scanning apertures are shown in a single spiral configuration, other scanning aperture configurations appropriate for full scanning across a scanning aperture and field of view may also be used such as a pair of interlaced spirals or a plurality of interlaced spirals. Thus, the preferred number of scanning apertures may be arranged in a single spiral of approximately 60 scanning apertures, a pair of spirals of 30 scanning apertures interlaced or offset in angular rotation, or any other scanning configuration. Furthermore scanning slot apertures may be used instead of scanning dot apertures and the scanning slots may be tapered.

Thus, a variety of raster scanning patterns may be implemented using a mechanical scanning disk.

Upon rotation of the mechanical scanning disk 15, the scanning apertures 22 traverse successively across the scanning aperture 24, sweeping scan lines of light across a field of view. A caller or other object at the calling/transmitting station is therefor illuminated in successive scan lines of light with varying light amplitude detected by photomultiplier tube 18. PMT 18 therefore generates an analog serial scanning signal encoding the light amplitude information about the object for subsequent image reproduction.

Figures 4, 4A:
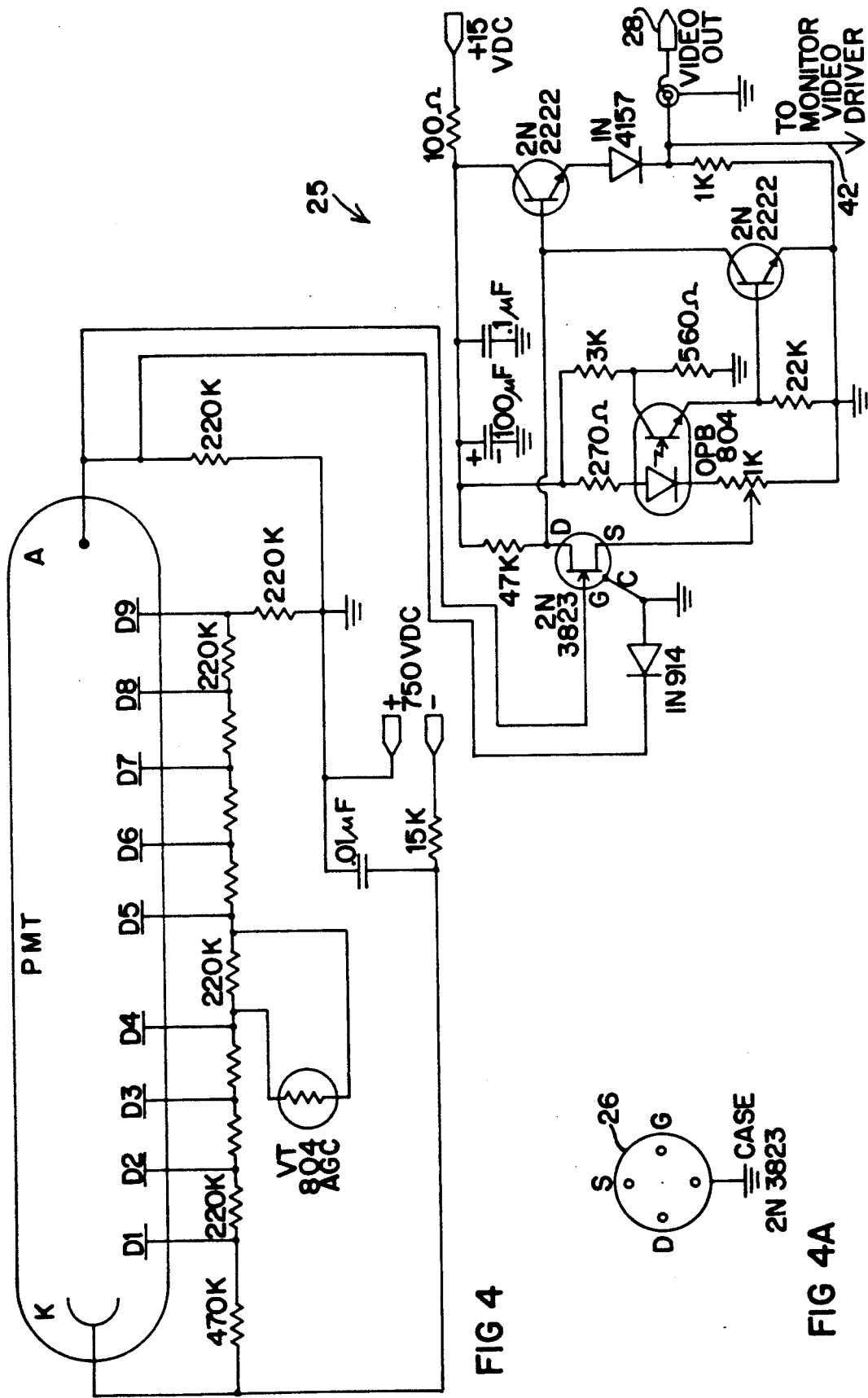
FIG. 4 is a schematic circuit diagram of the photomultiplier tube sensor (PMT) and preamplifier driver circuit coupled to the output of the PMT for delivering a pulse amplitude modulated video signal output.
FIG. 4A is a detailed diagrammatic plan view of the pin diagram for the FET input transistor of the preamplifier driver circuit.

As shown in FIG. 4 the PMT provides an intensified or multiplied output coupled to the FET input transistor 2N3283 of the preamplifier driver circuit 25. The pin designations for the drain, source, gate, and grounded case pins for the input FET transistor 26 are shown in FIG. 4A. The output 28 of preamplifier driver circuit 25 is an amplified pulse amplitude modulated signal encoding the amplitude information about the original object.

The pulse amplitude modulated output signal 28 from the preamplifier driver circuit 25 is coupled to the input 30 of an A/D convertor 32 illustrated in FIG. 3. The output of A/D convertor 32 is therefore a digitized pulse signal which is coupled to the bandwidth limited telephone line T, R through modem 34 operating as a transmitting modem. At a second location illustrated in FIG. 8, the digitized signal transmitted on the loaded telephone line T, R is coupled by the second modem 35 operating as a receiver modem to D/A converter 36. The digital to analog convertor reconstructs the amplitude modulated analog serial scanning signal at the analog video output 40 as hereafter described in further detail.

Figure 5:
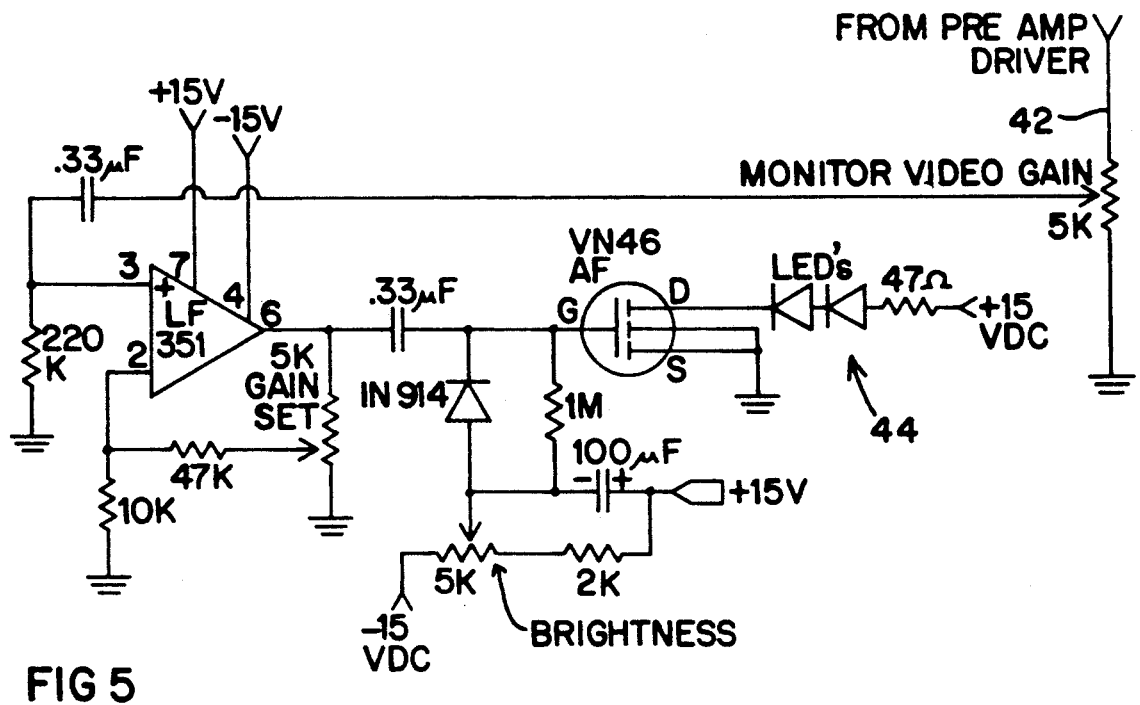
FIG. 5 is a schematic circuit diagram of the video monitor driver circuit for visual monitoring of the video signal at the full motion video camera pickup location.

Returning to FIG. 4, the preamplifier driver circuit 25 also provides an analog video monitor signal 42 which may be used to monitor the image information signal directly at the transmitting station. For monitoring a reproduced image at the transmitting station, the analog to digital converter coupled at the preamplifier video output 28 is bypassed. The monitoring signal output 42 is coupled directly to a monitor video driver circuit illustrated in FIG. 5. The monitor video gain is selected at the input of signal 42 and the input signal is processed for driving light emitting diodes (LED's) 44. The LED's respond with changing light amplitude in accordance with the light amplitude image information signal. The LED's 44 may be viewed through a separate monitoring scanning disk synchronized with the first scanning disk of the camera pickup.

Figure 6:
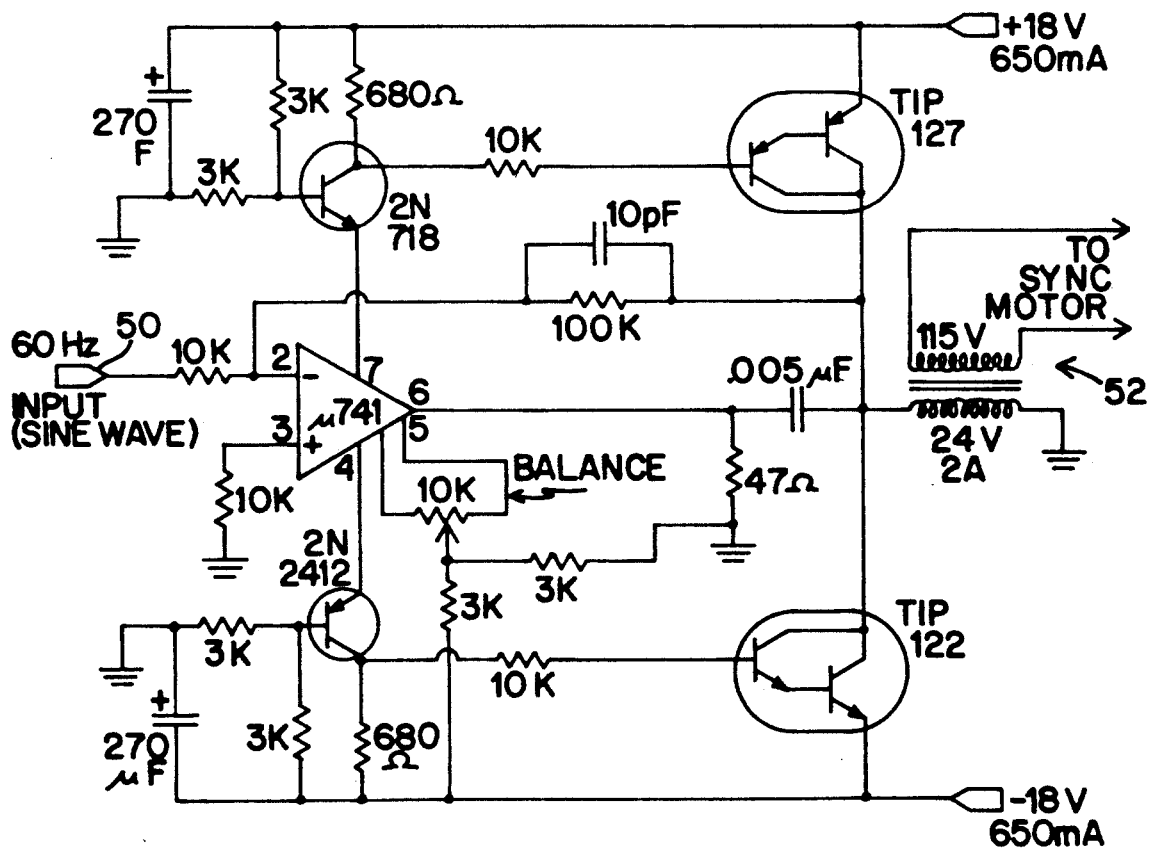
FIG. 6 is a schematic circuit diagram of the first clock circuit coupled to a utility 60 Hz power supply for generating an amplified first clock signal and for synchronizing operation of the first synchronous motor with the first clock signal.

The drive motor 12 for the camera pickup scanning disk 15 is a synchronous motor synchronized with a first clock signal generated by the first clock circuit illustrated in FIG. 6. The clock circuit is in turn synchronized with an external reference standard clock, in this instance the utility 60 cycle power supply available at the first location or transmitting location which provides the input 50 to the clock circuit. The first clock signal at the primary of transformer 52 is an amplified 60 Hz square wave signal. The clock circuit of FIG. 6 drives the primary coil of transformer 52 which provides a 60 Hz square wave synchronous power supply through its secondary for driving the synchronous motor 12 in synchronism with the first clock signal and referenced to the reference clock standard.

Figure 8:
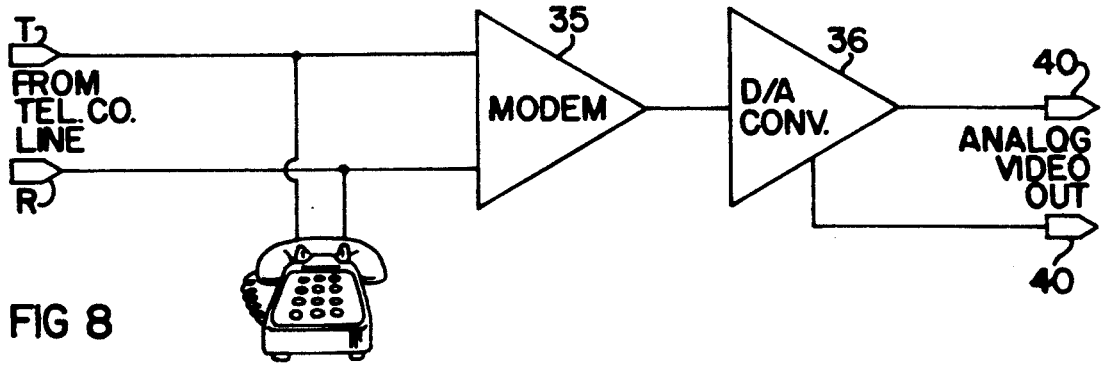
FIG. 8 is a simplified block diagram of a receiving station for the full motion video telephone system.

Elements of the receiving station of FIG. 8 are illustrated in further detail in FIG. 9. The digitized video or image information signal from modem 35 provides the video input 55 to the digital to analog convertor 36 through a contrast control coupled as illustrated in FIG. 9. The amplitude modulated analog serial scanning signal reconstructed by D/A convertor 36 provides the analog output 40 or X' which also provides the input to an LED array 60 whose light amplitude is in turn modulated by the reconstructed analog serial scanning signal. The power supplies for the D/A convertor 36 and LED array 60 are provided by power supply 62 also illustrated in FIG. 9.

The receiving station LED array 60 is viewed through a scanning disk of the full motion video camera receiver. The receiver scanning disk is similar to the Nipkow disk 15 illustrated in FIG. 2 and may differ for example only in size. The configuration of the full motion video camera receiver is similar to the video camera pickup of FIGS. 1-3 except that the LED array 60 of FIG. 9 replaces the light projector 16 of FIG. 1 and no PMT 18 is required. An alternative LED array 64 which may be incorporated in the circuit of FIG. 9 is illustrated in FIG. 9A.

Figure 10:
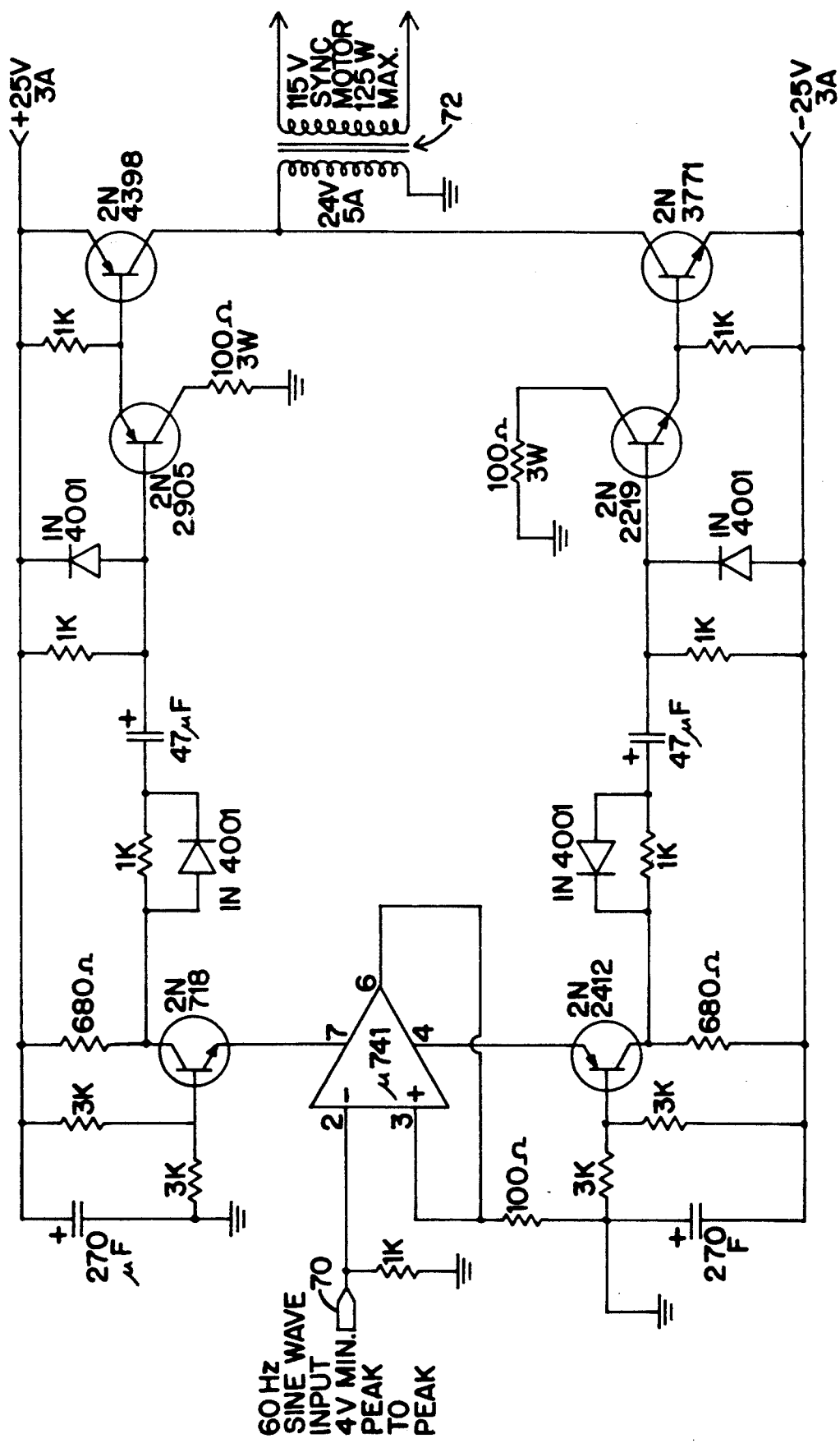
FIG. 10 is a detailed schematic circuit diagram of the second clock circuit for generating an amplified second clock signal from the utility 60 Hz power supply for synchronizing operation of the second synchronous motor and second mechanical scanner at the receiving station with the first mechanical scanner at the transmitter station.

While the LED array 60 or 64 faithfully reproduces the light amplitude image information of the original object, phase image information for proper positioning of light amplitude emissions from the LED array through the scanning apertures 22 of a rotating Nipkow disk 15 is effectively provided by the second clock circuit at the receiving station illustrated in FIG. 10. The second clock circuit generates a second clock signal referenced with the same external reference clock standard as the first clock signal generated by the first clock circuit of FIG. 6. Thus the input 70 of the second clock circuit of FIG. 10 is coupled to the utility 60 cycle power supply available at the second location. The second clock signal is an amplified 60 Hz square wave signal at the primary of transformer 72. The second clock circuit drives the primary coil of transformer 72 and effectively provides a 60 Hz square wave synchronous power supply through the secondary of transformer 72 for driving the second synchronous drive motor at the receiving station. The second synchronous drive motor therefore rotates the scanning disk of the camera receiver in synchronism and in phase with the scanning disk of the camera pickup of the transmitting station. As a result proper phase positioning of the reproduced light amplitude emissions from LED array 60 are faithfully reproduced for reconstructing full motion images of the original object. A phase adjuster or hunting circuit may be necessary to adjust for phase differences in the case of different utility power supplies at the first and second locations.

In selecting operating parameters for the full motion video camera pickup and camera receiver within the operating parameter ranges of the present invention, the following factors are considered. At 900 RPM, the lower end of the acceptable range of RPM's for rotation of the Nipkow disk, the temporal frequency of the full motion image reproduction is approximately 15 frames per second, also referred to as pictures per second or PPS. The frequency of 15 PPS approaches the critical flicker frequency of human visual perception and noticeable flicker begins to occur below the critical flicker frequency. At the preferred rate of rotation of 1200 RPM's the resolution of full motion image reproduction is 20 frames per second, Edison's standard for smooth motion picture projection. As with other operating range parameters according to the invention the upper limit of rotation speed at 1600 RPM begins to test the bandwidth of the bandwidth limited telephone line transmission channel according to the selection of other concurrent operating range parameters.

The arrangement of component elements of the full motion video camera pickup illustrated in FIG. 1 may be inverted so that the object or caller whose full motion image is to be transmitted does not have to be in relative darkness. According to the inverted arrangement, the positions of the light projector 16 and photomultiplier tube 18 are interchanged. Thus, the light projector 16 is positioned in front of the scanning disk 15 illuminating the entire object or caller. The PMT 18 is positioned behind the scanning disk 15 for example at the scanning aperture 24. Upon rotation of the scanning disk, the PMT 18 "looks at" the object in scan lines across the field of view through the successive scanning apertures 22. As used in the specification and claims, either of the camera pickup scanning disk arrangements are referred to as mechanical scanners and flying spot scanners. Thus the phrase "mechanical flying spot scanner" is intended to include either configuration of "looking at" the entire object with flying light spot illumination of scanning elements of the object only; or illuminating the entire object and, only "looking at" scanning elements of the object through a flying spot aperture.

The scanning disc size may be selected according to the desired size of the field of new and desired full motion image reproduction size. A projector lens may be positioned at the scanning aperture for projecting the full motion image onto a screen. Alternatively, a video recorder may be optically coupled to the camera receiver scanning aperture for recording and reproducing the full motion image on a TV screen or video monitor.

While the invention has been described with reference to the preferred use of mechanical scanning disks or Nipkow disks, other mechanical scanners may also be used such as optical drum scanners and mirror galvanometer scanners. A rotating mirror drum scanner is described in the Baird U.S. Pat. No. 2,056,761 referred to above. With reference to this and other alternatives, the invention is intended to cover all modifications and equivalents within the scope of the following claims.

I claim:

1. A system for transmission and reception over bandwidth limited telephone lines of full motion video image information of an object in real time comprising:

a full motion video camera pickup comprising a first mechanical flying spot scanner means for causing light scanning of an object in picture frames with an image resolution in the range of approximately 30-90 scan lines per frame and full motion resolution in the range of approximately 15-30 frames per second, said mechanical flying spot scanner means comprising photomultiplier sensor means generating an analog serial scanning signal having an analog signal bandwidth within the analog frequency range of approximately 20-36 kHz kHz comprising full motion image information of the object in real time;

first clock means for generating a first clock signal at the camera pickup in synchronism with a selected reference clock standard;

first synchronous drive means operatively coupled to said first mechanical flying spot scanner means for driving said scanner means in synchronism with said first clock signal;

analog to digital (A/D) converter means converting said analog serial scanning signal to a digital signal for transmission of said digital signal;

a bandwidth limited telephone line and first modem coupling means at a first location coupling said digital signal to said telephone line for transmission over the bandwidth limited telephone line;

a digital to analog (D/A) converter means at a second location and second modem coupling means for coupling the digital signal transmitted over said bandwidth limited telephone line to the D/A converter means for digital to analog conversion, said D/A converter means substantially reproducing the analog serial scanning signal comprising full motion image information of the object in real time;

a full motion video camera receiver comprising a second mechanical flying spot scanner means for causing projection and mechanical scanning of light in picture frames in accordance with said analog serial scanning signal for reproducing full motion image information about the object in real time;

said camera receiver comprising an LED array light source having light output controlled by the reproduced analog serial scanning signal;

second clock means for providing a second clock signal at the camera receiver substantially in synchronism with the first clock signal;

and second synchronous drive means operatively coupled to said second mechanical flying spot scanner means for driving said scanner means in synchronism with the second clock signal to provide scan lines per frame and frames per second substantially in synchronism with said first mechanical flying spot scanner means thereby reproducing a full motion image of the object in real time;

said camera pickup and camera receiver each comprising a mechanical scanning disk formed with scanning hole apertures arranged in a scanning configuration for light scanning in picture frame scan lines upon rotation of the scanning disc, with the number of scanning hole apertures being in the range of approximately 30-90, said first and second synchronous drive means being constructed to drive and rotate said respective scanning disks in revolutions per minute in the range of approximately 900-1800 RPM's.

2. The system of claim 1 wherein each scanning disk is formed with approximately 60 hole apertures arranged to provide approximately 60 scan lines per frame and wherein the first and second synchronous drive means drive and rotate the respective scanning disks at approximately 1200 RPM, thereby providing full motion resolution of approximately 20 frames per second.

3. The system of claim 1 wherein the camera receiver comprises a projector lens for projecting the reproduced full motion image information of the object in real time on a screen.

4. The system of claim 1 further comprising a video recorder optically coupled to the camera receiver for recording and reproducing the reproduced full motion image information of the object in real time on a TV screen or video monitor.

5. The system of claim 1 wherein the mechanical flying spot scanner means comprises a light source and scanning disk constructed to provide a scanning window size of approximately 1"×1" (2.5 cm×2.5 cm).

6. The system of claim 1 wherein the analog to digital converter means is constructed to convert the analog serial scanning signal to a digital signal for transmission from the first location without interleaving and transmitting the first clock signal, and wherein the second clock means separately generates the second clock signal from said reference clock standard at the second location.

7. The system of claim 6 wherein the reference clock standard is a utility 60 Hz power supply available at the first and second locations.

8. The system of claim 1 wherein said first and second clock means for generating the first and second clock signals comprise clock circuits coupled to a standard utility 60 Hz power supply for separately deriving said first and second clock signals respectively from the standard utility 60 Hz power supply at said separate first and second locations.

9. The system of claim 1 wherein the modem coupling means are constructed to provide a transmission rate in the range of 2400-9800 baud.

10. The system of claim 1 wherein the camera pickup comprises said scanning disk, a light source on the side of the scanning disk opposite the object, and a photomultiplier tube detector on the same side of the scanning disk as the object.

11. The system of claim 1 wherein the camera pickup comprises said scanning disk, a light source on the same side of the scanning disk as said object illuminating said object, and a photomultiplier tube detector on the opposite side of the scanning disk from said object.

12. The system of claim 1 wherein the telephone line comprises a standard loaded telephone line with effective analog signal bandwidth in the range of approximately 0-4 kHz.

13. A system for transmission and reception over bandwidth limited telephone lines of full motion image information of an object in real time comprising:
   a full motion image camera pickup comprising first mechanical scanning means for causing scanning pickup of light amplitude image information of an object in picture frames with an image resolution in the range of approximately 30-90 scan lines per frame and motion resolution in the range of approximately 15-30 frames per second for full motion image information, and photomultiplier light detector means generating an analog serial scanning signal encoding said light amplitude image information about the object with an analog signal bandwidth in the range of approximately 20-36 kHz;
   first clock signal circuit means for generating a first clock signal in synchronism with a selected reference clock standard;
   first synchronous motor drive means operatively coupled to the first mechanical scanning means for causing scanning pickup in synchronism with said first clock signal for preserving phase image information about the object;
   A/D converter means converting said analog serial scanning signal to a digital signal;
   a bandwidth limited telephone line and first modem coupling means at a first location coupling said digital signal to the telephone line for transmission to a second location;
   D/A converter means for converting said digital signal transmitted over the telephone line to reproduce said analog serial scanning signal encoding the light amplitude image information about the object and second modem coupling means at the second location coupling said digital signal from the telephone line to the D/A converter means;
   a full motion image camera receiver comprising second mechanical scanning means for causing scanning projection of the light amplitude image information encoded in said reproduced analog serial scanning signal;
   said camera receiver comprising an LED array light source having light output controlled by the reproduced analog serial scanning signal;
   second clock signal circuit means for generating a second clock signal in accordance with said selected reference clock standard;
   and second synchronous motor drive means operatively coupled to the second mechanical scanning means for causing scanning projection in synchronism with said second clock signal and substantially in synchronism with the scanning pickup by the first mechanical scanning means of said full motion image camera pickup, thereby preserving the phase image information about the object for effective scanning projection of the light amplitude image information in said picture frames to reproduce a full motion image of said object in real time;
   said camera pickup and camera receiver each comprising a mechanical scanning disk formed with scanning hole apertures arranged in a scanning configuration for light scanning in picture frame scan lines upon rotation of the scanning disc with the number of scanning hole apertures being in the range of approximately 30-90, said first and second synchronous drive means being constructed to drive and rotate said respective scanning disks in revolutions per minute in the range of approximately 900-1800 RPM's.

14. The system of claim 13 wherein the bandwidth limited telephone line comprises a loaded telephone line with effective analog signal bandwidth in the range of approximately 0-4 kHz.

15. The system of claim 13 wherein the first mechanical scanning means causes scanning pickup with image resolution at the preferred spatial frequency of approximately 60 scan lines per frame, and with motion resolution at the preferred temporal frequency of approximately 20 frames per second.

16. The system of claim 13 wherein the analog to digital converter means is constructed to convert the analog serial scanning signal to a digital signal for transmission from the first location without interleaving and transmitting the first clock signal, and wherein the second clock means separately generates the second clock signal from said reference clock standard at the second location.

17. The system of claim 16 wherein the reference clock standard is a utility 60 Hz power supply available at the first and second locations.

18. The system of claim 13 wherein the image resolution is approximately 60 scan lines per frame, and the motion resolution is approximately 20 frames per second;
   wherein the first and second coupling means comprise modems with a transmission rate of approximately at least 4800 baud; and
   wherein the bandwidth limited telephone line comprises a loaded line with an analog signal bandwidth of approximately 0-4 kHz.

* * * * *